US010228035B2

(12) United States Patent
Engman et al.

(10) Patent No.: US 10,228,035 B2
(45) Date of Patent: Mar. 12, 2019

(54) VELOCITY DEPENDENT BRAKE FOR CLUTCH ACTUATOR

(71) Applicant: Kongsberg Automotive AS, Kongsberg (NO)

(72) Inventors: Lars Jimmy Engman, Kongsberg (NO); Geir Brudeli, Hokksund (NO); Eivind Lund Vikebø, Kongsberg (NO)

(73) Assignee: KONGSBERG AUTOMOTIVE AS, Kongsberg (NO)

( * ) Notice: Subject to any disclaimer, the term of this patent is extended or adjusted under 35 U.S.C. 154(b) by 431 days.

(21) Appl. No.: 15/187,344

(22) Filed: Jun. 20, 2016

(65) Prior Publication Data

US 2017/0363165 A1 Dec. 21, 2017

(51) Int. Cl.
| | | |
|---|---|---|
| *F16D 67/02* | (2006.01) | |
| *F16D 23/00* | (2006.01) | |
| *F16D 28/00* | (2006.01) | |
| F16D 121/14 | (2012.01) | |
| F16D 125/40 | (2012.01) | |
| F16D 23/12 | (2006.01) | |

(52) U.S. Cl.
CPC ............. *F16D 67/02* (2013.01); *F16D 23/00* (2013.01); *F16D 28/00* (2013.01); *F16D 2023/123* (2013.01); *F16D 2121/14* (2013.01); *F16D 2125/40* (2013.01)

(58) Field of Classification Search
CPC .......... F16D 67/02; F16D 28/00; F16D 23/00; F16D 2023/123; F16D 2121/14; F16D 2125/40

USPC ................... 192/84.1–84.3, 84.6, 94; 475/5; 74/473.3
See application file for complete search history.

(56) References Cited

U.S. PATENT DOCUMENTS

| | | |
|---|---|---|
| 4,672,858 A | 6/1987 | Langowski |
| 4,773,500 A | 9/1988 | Naito et al. |
| 4,858,131 A | 8/1989 | Sugimura et al. |
| 4,926,994 A | 5/1990 | Koshizawa et al. |
| 5,398,780 A | 3/1995 | Althof et al. |
| 5,407,042 A | 4/1995 | Fukui et al. |
| 5,899,829 A | 5/1999 | Salecker et al. |

(Continued)

FOREIGN PATENT DOCUMENTS

| | | |
|---|---|---|
| DE | 2846778 A1 | 6/1979 |
| DE | 3019274 A1 | 11/1981 |

(Continued)

OTHER PUBLICATIONS

International Search Report for International Application No. PCT/IB2017/000880, dated Dec. 15, 2017 (5 pp.).

(Continued)

*Primary Examiner* — Victor L MacArthur
(74) *Attorney, Agent, or Firm* — Cantor Colburn LLP

(57) ABSTRACT

A clutch actuator assembly includes a drive member, a threaded rod including a first end operatively connected to the drive member, a second end, and an intermediate portion including a plurality of threads extending therebetween. A member is threadably engaged with the plurality of threads of the threaded rod, a clutch actuator member is arranged at the second end of the threaded rod, and a velocity brake is operatively coupled to the threaded rod. The velocity brake decelerates rotation of the threaded rod.

15 Claims, 2 Drawing Sheets

(56) References Cited

U.S. PATENT DOCUMENTS

| | | | |
|---|---|---|---|
| 5,996,720 | A | 12/1999 | Hunt |
| 6,095,943 | A | 8/2000 | Reuthal |
| 6,358,186 | B1 | 3/2002 | Kosik et al. |
| 6,692,396 | B1 | 2/2004 | Grogg et al. |
| 6,725,989 | B1 | 4/2004 | Krisher et al. |
| 2003/0186772 | A1 | 10/2003 | Grogg et al. |
| 2004/0138024 | A1 | 7/2004 | Hiroyuki et al. |
| 2013/0146417 | A1 | 6/2013 | Lee et al. |
| 2014/0005864 | A1 | 1/2014 | Holmes et al. |
| 2015/0027245 | A1 | 1/2015 | Perakes et al. |
| 2015/0308549 | A1* | 10/2015 | Hirai .............. F16H 25/205 74/89.29 |

FOREIGN PATENT DOCUMENTS

| | | | |
|---|---|---|---|
| DE | 3151416 | A1 | 7/1983 |
| DE | 19723394 | A1 | 12/1997 |
| DE | 19744051 | A1 | 4/1998 |
| DE | 19905434 | A1 | 10/1999 |
| DE | 103 03 141 | A1 | 7/2004 |
| DE | 102014201212 | A1 | 7/2015 |
| EP | 0038113 | A2 | 10/1981 |
| EP | 0101220 | A2 | 2/1984 |
| EP | 0108506 | A1 | 5/1984 |
| EP | 0114513 | A1 | 8/1984 |
| EP | 0231393 | A1 | 8/1987 |
| EP | 0536932 | A2 | 4/1993 |
| EP | 0536933 | A2 | 4/1993 |
| EP | 0658698 | A2 | 6/1995 |
| EP | 0754588 | A1 | 1/1997 |
| EP | 0787930 | A2 | 8/1997 |
| EP | 0864482 | A2 | 9/1998 |
| EP | 1258387 | A2 | 11/2002 |
| EP | 1529979 | A2 | 5/2005 |
| EP | 1669627 | A2 | 6/2006 |
| EP | 1674755 | A2 | 6/2006 |
| EP | 1683697 | A1 | 7/2006 |
| EP | 1857704 | A2 | 11/2007 |
| EP | 1975445 | A2 | 10/2008 |
| EP | 2112392 | A1 | 10/2009 |
| EP | 2325512 | A2 | 5/2011 |
| EP | 2354584 | A1 | 8/2011 |
| EP | 2743114 | A2 | 6/2014 |
| EP | 2865915 | A2 | 4/2015 |
| JP | S61278629 | A | 12/1986 |
| JP | S62286843 | A | 12/1987 |
| JP | H04123939 | A | 4/1992 |
| JP | H5338555 | A | 12/1993 |
| JP | H6241298 | A | 8/1994 |
| JP | H6241299 | A | 8/1994 |
| JP | H6241300 | A | 8/1994 |
| JP | H6241301 | A | 8/1994 |
| JP | H6265012 | A | 9/1994 |
| JP | H6272761 | A | 9/1994 |
| JP | H9324850 | A | 12/1997 |
| JP | H9324851 | A | 12/1997 |
| JP | H11245679 | A | 9/1999 |
| JP | 2001173769 | A | 6/2001 |
| JP | 2001301494 | A | 10/2001 |
| JP | 200231168 | A | 1/2002 |
| JP | 2002031158 | A | 1/2002 |
| JP | 2002031159 | A | 1/2002 |
| JP | 2004044666 | A | 2/2004 |
| JP | 2007292212 | A | 11/2007 |
| WO | 9300227 | A1 | 1/1993 |
| WO | 9502857 | A1 | 1/1995 |
| WO | 0034689 | A2 | 6/2000 |
| WO | 0133093 | A1 | 5/2001 |
| WO | 03016738 | A1 | 2/2003 |
| WO | 03052292 | A2 | 6/2003 |
| WO | 2007030042 | A1 | 3/2007 |
| WO | 2008087065 | A1 | 7/2008 |
| WO | 2008119692 | A1 | 10/2008 |
| WO | 2012110658 | A1 | 2/2011 |
| WO | 2011080439 | A1 | 7/2011 |
| WO | 2013124121 | A1 | 8/2013 |
| WO | 2014135831 | A2 | 9/2014 |
| WO | 2014177168 | A1 | 11/2014 |
| WO | 2015158343 | A2 | 10/2015 |

OTHER PUBLICATIONS

Written Opinion of the International Searching Authority for International Application No. PCT/IB2017/000880 dated Dec. 15, 2017 (6 pp.).

\* cited by examiner

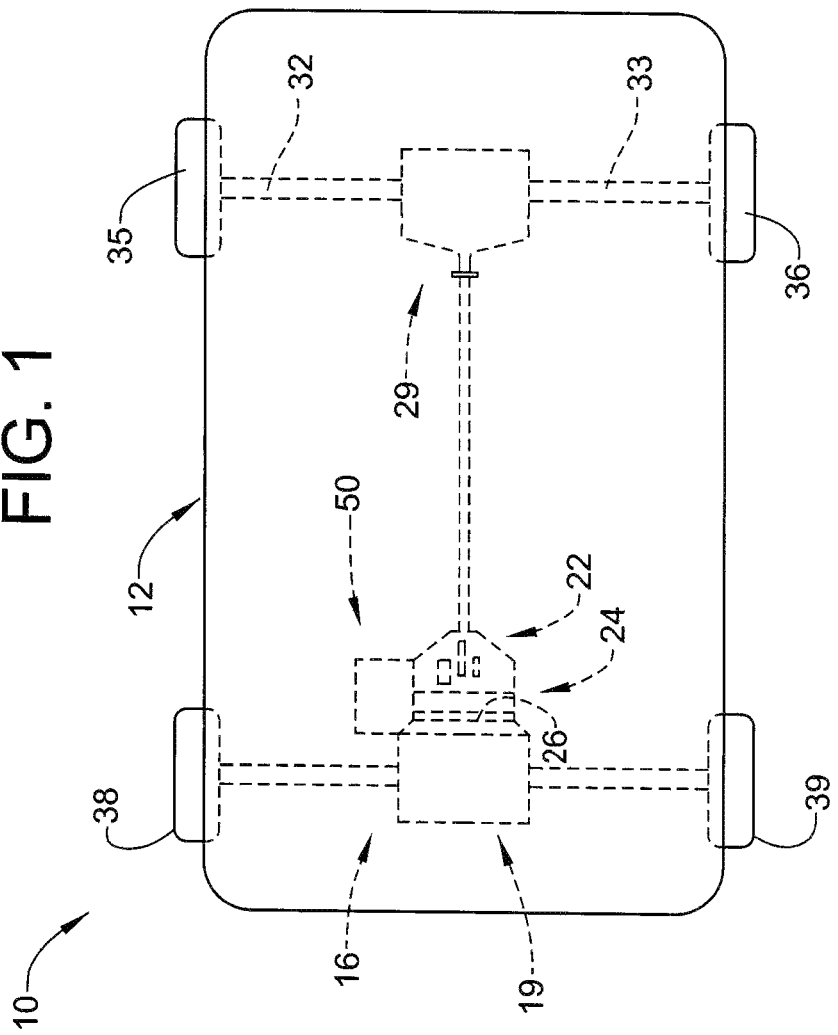

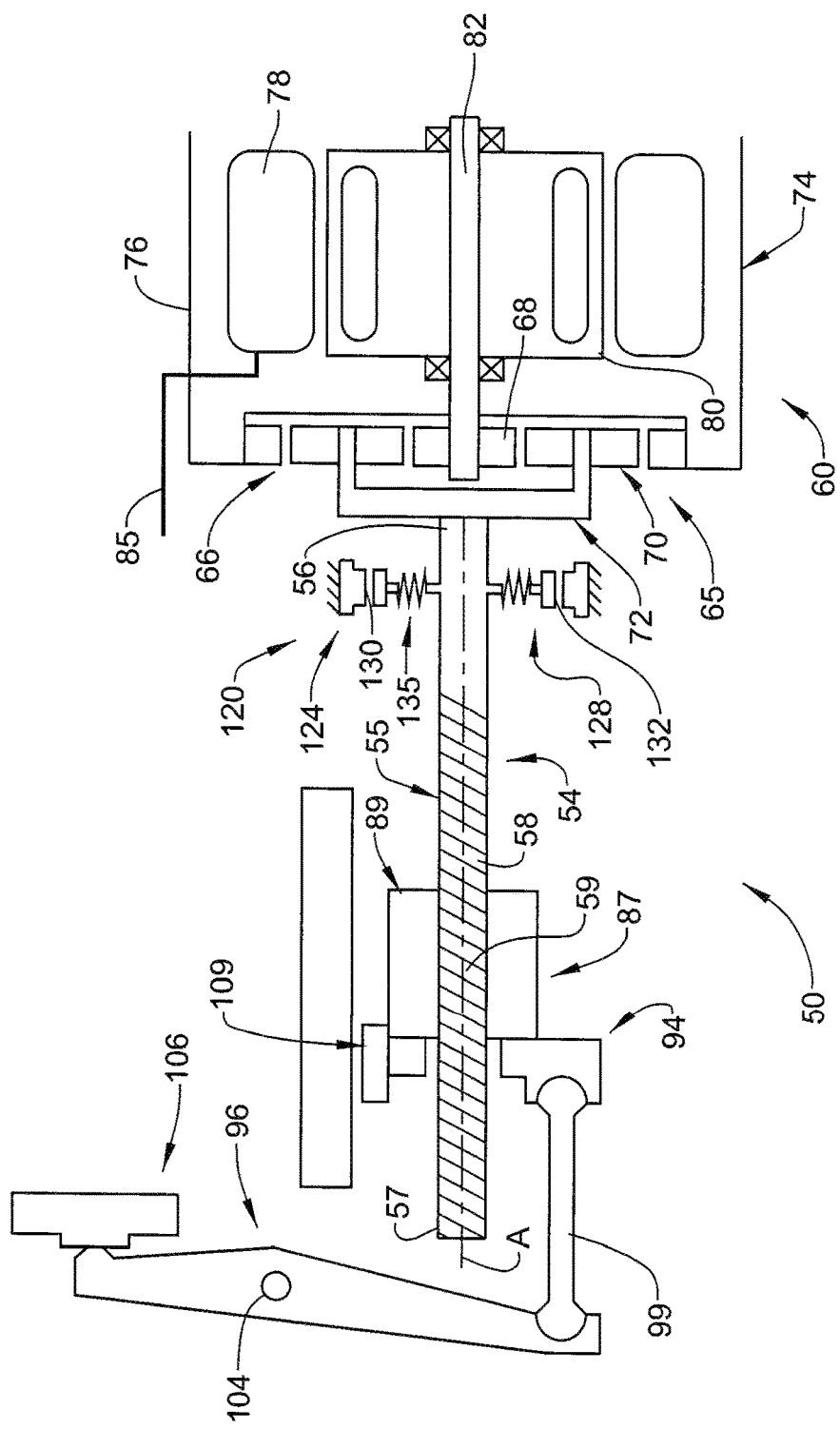

VELOCITY DEPENDENT BRAKE FOR CLUTCH ACTUATOR

FIELD OF THE INVENTION

The subject invention relates to clutch systems and, more particularly, to a velocity dependent brake for a clutch actuator.

BACKGROUND

Many systems make use of clutches that are employed to temporarily stop a rotating object to make a system change. Vehicles may employ a clutch to aid in changing between gears. More specifically, the clutch may transition between an engaged state and a disengaged state. In the engaged state, the clutch is operably coupled to a fly wheel transmitting power from an engine to a transmission. In the disengaged state, the clutch is released from the fly wheel decoupling the engine and the transmission.

Typically, a clutch actuator works against a load in a single direction, e.g., going from an engaged to a disengaged state. In an automatic manual transmission (AMT) vehicle, it is desirable to control the clutch actuator transitioning from the disengaged state to an engaged state. Using existing engines to control clutch actuator engagement may detract from overall vehicle efficiency. Accordingly, it is desirable to provide a system that may be employed to control clutch engagement without placing additional loads on existing systems.

SUMMARY OF THE INVENTION

In accordance with an exemplary aspect, a clutch actuator assembly includes a drive member, a threaded rod including a first end operatively connected to the drive member, a second end, and an intermediate portion including a plurality of threads extending therebetween. A member is threadably engaged with the plurality of threads of the threaded rod, a clutch actuator member is arranged at the second end of the threaded rod, and a velocity brake is operatively coupled to the threaded rod. The velocity brake decelerates rotation of the threaded rod.

In accordance with another aspect of an exemplary embodiment, a transmission system includes a body housing a plurality of gears, and a clutch assembly mounted to the body. The clutch assembly provides a selectively engageable interface to an engine. A clutch actuator assembly is operatively connected to the clutch assembly. The clutch actuator assembly includes a drive member, a threaded rod including a first end operatively connected to the drive member, a second end, and an intermediate portion including a plurality of threads extending therebetween, a member threadably engaged with the plurality of threads of the threaded rod, a clutch actuator member arranged at the second end of the threaded rod, and a velocity brake operatively coupled to the threaded rod. The velocity brake decelerates rotation of the threaded rod.

The above features and advantages and other features and advantages of the invention are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 depicts an engine vehicle having a clutch actuator assembly provided with a velocity brake, in accordance with an exemplary embodiment; and FIG. 2 schematically depicts the clutch actuator assembly of FIG. 1.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

A vehicle in accordance with an exemplary embodiment is indicated generally at 10 in FIG. 1. Vehicle 10 includes a body 12 supported on a chassis (not shown). Vehicle 10 also includes a drivetrain 16 having a prime mover or engine 19 operatively connected to a transmission system 22 through a clutch assembly 24. Engine 19 may take on a variety of forms including internal combustion engines, electric engines, and hybrid electric/combustion engines. Transmission system 22 may take the form of an automated manual transmission (AMT). Clutch assembly 24 includes a clutch 26 which may take the form of a friction disc (not separately labeled) that provides a selective interface between transmission system 22 and engine 19. Transmission system 22 is operatively connected to a rear differential 29 which provides power through first and second axles 32 and 33 to corresponding first and second rear wheels 35 and 36. Vehicle 10 is also shown to include first and second front wheels 38 and 39. It is to be understood that the number and arrangement of wheels may vary. It is also to be understood that transmission system 22 could alternatively be coupled to first and second front wheels 38 and 39.

In accordance with an exemplary embodiment, vehicle 10 also includes a clutch actuator assembly 50 that selectively disengages and controllably engages clutch 26. As shown in FIG. 2, clutch actuator assembly 50 includes a threaded rod 54 which may take the form of a ball screw 55 having a first end 56, a second end 57, and an intermediate portion 58 supporting a plurality of threads 59 extending therebetween. A drive member 60 rotates ball screw 55 about an axis "A". More specifically, first end 56 of ball screw 55 is operatively connected to drive member 60. A gear set 65 may provide an interface between ball screw 55 and drive member 60. Gear set 65 may take the form of a planetary gear set 66 having a sun gear 68 and a plurality of planet gears 70 that are coupled to first end 56 through a bracket 72. Drive member 60 may take the form of an electric engine 74 having a housing 76 that may enclose a stator 78 and a rotor 80 mounted to a shaft 82 connected to sun gear 68. Electric engine 74 may be coupled to a control system (not shown) that provides a control signal through a conductor 85.

Clutch actuator assembly 50 also includes a member 87 threadably supported on threaded rod 54. Member 87 may take the form of a ball nut 89 that may transition along intermediate portion 58 between first and second ends 56 and 57 when threaded rod 54 is rotated. Clutch actuator assembly 50 further includes a clutch actuator member 94 that is selectively engaged by ball nut 89. Clutch actuator member 94 is operatively connected to a clutch lever 96 through a pushrod 99. Clutch lever 96 pivots about a point 104 to shift a clutch release bearing 106 into and out of engagement with fingers (not shown) on a pressure plate (also not shown) to release and/or engage clutch 26 with the flywheel. Clutch actuator assembly 50 may also include a position sensor 109 that may provide position feedback to the controller in order to enhance clutch engagement and assist in determining clutch wear.

In further accordance with an exemplary embodiment, clutch actuator assembly 50 includes a velocity brake 120 operatively connected to ball screw 55. Velocity brake 120 operates to slow rotation of ball screw 55 when clutch 26 shifts from a disengaged configuration to an engaged configuration. Velocity brake 120 includes a stationary member 124 and a rotating member 128. Rotating member 128 interacts with stationary member 124 to impede rotation of ball screw 55. Stationary member 124 includes a first surface 130 and rotating member 128 includes a second surface 132.

A compliant member 135 allows rotating member 128 to move radially outwardly toward stationary member 124 in response to centrifugal forces generated by rotation of ball screw 55. The greater the centrifugal force, the greater the interaction between first surface 130 and second surface 132. In accordance with an aspect of an exemplary embodiment first and second surfaces 130 and 132 include a friction inducing material (not separately labeled). When second surface 132 engages first surface 130, friction inducing surfaces interact to impede rotation of ball screw 55.

In accordance with another aspect of an exemplary embodiment, first surface 130 may comprise an electrically conductive material. Second surface 132 may comprise one or more magnets (not separately labeled). When second surface 132 nears first surface 130 the one or more magnets interact with an electrical field generated at first surface 130 generating a repulsive force that slows rotation of ball screw 55. It is to be understood that, in an alternative aspect, first surface 130 may comprise one or more magnets and second surface 132 may comprise an electrically conductive material that selectively generates an electrical field. Velocity brake 120 ensures a smooth transition from a disengaged state to an engaged state of clutch 26. Further, the use of velocity brake 120 removes a load from drive member 60. Removing a load in the form of braking forces enables the use of an engine having a lower power rating over that needed to provide braking forces. Reducing an overall size of drive member 60 may increase an overall efficiency of vehicle 10 by reducing weight and power requirements.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A clutch actuator assembly comprising:
   a drive member;
   a threaded rod including a first end operatively connected to the drive member, a second end, and an intermediate portion including a plurality of threads extending therebetween;
   a member threadably engaged with the plurality of threads of the threaded rod;
   a clutch actuator member arranged at the second end of the threaded rod; and
   a velocity brake operatively coupled to the threaded rod, the velocity brake decelerating rotation of the threaded rod.

2. The clutch actuator assembly according to claim 1, further comprising: a clutch release bearing mounted to a lever, the lever being operatively connected to the clutch actuator member through a pushrod.

3. The clutch actuator assembly according to claim 1, wherein the velocity brake includes a stationary member and a rotating member operatively coupled to the threaded rod.

4. The clutch actuator assembly according to claim 3, further comprising: a compliant member operatively coupled between the threaded rod and the rotating member.

5. The clutch actuator assembly according to claim 3, wherein the rotating member includes a surface provided with a friction inducing material.

6. The clutch actuator assembly according to claim 3, wherein the stationary member comprises an electrically conductive surface operable to generate an electrical field and the rotating member comprises a second magnet.

7. The clutch actuator assembly according to claim 1, wherein the driving member comprises an engine.

8. The clutch actuator assembly according to claim 7, wherein the engine comprises an electric engine.

9. The clutch actuator assembly according to claim 7, further comprising: a planetary gear set operatively connecting the threaded rod and the engine.

10. The clutch actuator assembly according to claim 1, further comprising: a position sensor arranged to sense a position of the member relative to the threaded rod.

11. A transmission system comprising:
    a body housing a plurality of gears;
    a clutch assembly mounted to the body, the clutch assembly providing a selectively engageable interface to an engine; and
    a clutch actuator assembly operatively connected to the clutch assembly, the clutch actuator assembly comprising:
       a drive member;
       a threaded rod including a first end operatively connected to the drive member, a second end, and an intermediate portion including a plurality of threads extending therebetween;
       a member threadably engaged with the plurality of threads of the threaded rod;
       a clutch actuator member arranged at the second end of the threaded rod; and
       a velocity brake operatively coupled to the threaded rod, the velocity brake decelerating rotation of the threaded rod.

12. The transmission system according to claim 11, wherein the velocity brake includes a stationary member and a rotating member operatively coupled to the threaded rod.

13. The transmission system according to claim 12, further comprising: a compliant member operatively coupled between the threaded rod and the rotating member.

14. The transmission system according to claim 12, wherein the rotating member includes a surface provided with one of a friction inducing material and a magnet.

15. The transmission system according to claim 11, wherein the drive member comprises an electric engine.

* * * * *